Aug. 13, 1957  R. N. KNIGHTS  2,802,681
RELEASABLE LOCKING MECHANISM FOR SECURING
TELESCOPICALLY SLIDABLE MEMBERS
Filed Jan. 10, 1955  3 Sheets-Sheet 1
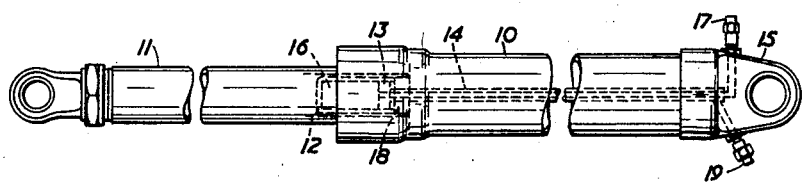
Fig. 1.
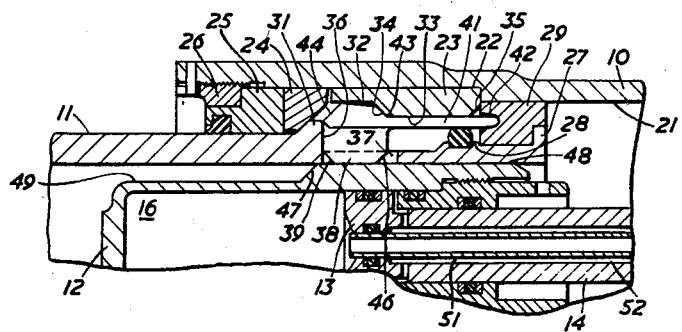
Fig. 2.
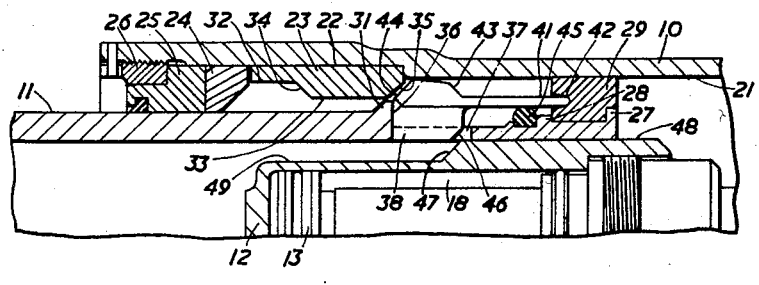
Fig. 9.  Fig. 3.
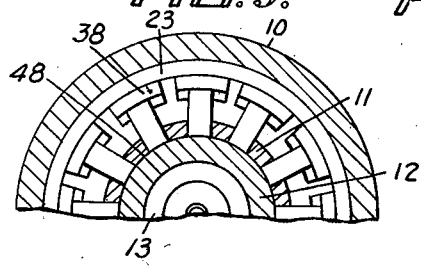
INVENTOR
RICHARD NORTHAM KNIGHTS
Reynolds, Beach & Christensen
BY
ATTORNEYS Aug. 13, 1957 R. N. KNIGHTS 2,802,681
RELEASABLE LOCKING MECHANISM FOR SECURING
TELESCOPICALLY SLIDABLE MEMBERS
Filed Jan. 10, 1955 3 Sheets-Sheet 2

INVENTOR
RICHARD NORTHAM KNIGHTS

Reynolds, Beach + Christensen
BY
ATTORNEYS

Aug. 13, 1957   R. N. KNIGHTS   2,802,681
RELEASABLE LOCKING MECHANISM FOR SECURING
TELESCOPICALLY SLIDABLE MEMBERS
Filed Jan. 10, 1955   3 Sheets-Sheet 3

INVENTOR
RICHARD NORTHAM KNIGHTS

Reynolds, Beach + Christensen
BY
ATTORNEYS

United States Patent Office 2,802,681
Patented Aug. 13, 1957

2,802,681

RELEASABLE LOCKING MECHANISM FOR SECURING TELESCOPICALLY SLIDABLE MEMBERS

Richard N. Knights, Hucclecote, England, assignor to Dowty Equipment Limited, Cheltenham, England Application January 10, 1955, Serial No. 480,961

7 Claims. (Cl. 287—58)

This invention relates to locking mechanism for securing two telescopically slidable members against thrust. Such a lock is required in fixing the two relatively slidable components of a mechanical strut, stay or hydraulic jack in one or the other limit position, for example. Each is an extensible member, and that term is to be understood as including either a strut or a jack or any similar device. The locking mechanism disclosed is of the kind comprising a plurality of locking elements carried by one member, a locking groove formed on the other member, and an axially slidable locking cylinder or retainer which is movable in one direction to displace the locking elements radially into and secure them in the locking groove, and in the other direction to permit the locking elements to withdraw from the locking groove.

In locking mechanisms of the kind referred to, balls are sometimes employed as the locking elements but there is a limitation on their use where high loads are concerned owing to point or line contact between the balls and the engaging surfaces of the locking groove and locking cylinder. Further, since the balls have to be retained captively in one of the telescopic members, the extent to which they can project into the locking groove is limited.

In another form of locking mechanism, claw-like elements are provided which have longitudinally extending tails pivotally connected at one end with one of the telescoping members, and carrying heads at their opposite end for engaging the other such member. The use of such members has not proven satisfactory, for the reason that a tension load is transferred between the two members, or from the one telescopic member to the head, through the tail. These tails are necessarily small and relatively weak, being in some instances resilient. In distinction to the above, the present invention utilizes claw-like locking elements, but their pivotal connection to the one member is a floating connection, not designed to nor capable of transmitting loads between such elements and such member, and the heads of the claw-like locking elements when in the locking position are directly interposed between facing abutments on the two telescopic members, and are held immovably in that disposition by a head-retaining surface of a movable locking cylinder or equivalent retainer. Thereby loads tending to shorten or collapse the extended telescoping members are transmitted directly from the abutment on one such member to the heads, and from the heads to the other such abutment. The heads are much more substantial than the tails, and hence much better suited to transmit such loads, and because of the floating nature of the pivots of the tails no load is imposed upon the tails, and they serve primarily to locate the claw-like locking elements properly. The retainer, be it a cylinder movable axially relative to the two telescoping members, a sleeve, or other equivalent device, is separately movable after the locking elements and the abutments which they are to engage are located relatively for engagement, to effect such engagement by a head-displacing surface which is adjacent the head-retaining surface already referred to. When the telescoping members are to be unlocked and collapsed, the retainer is first withdrawn from its locking position, allowing the heads then to be moved from between the two abutments. The complementally engaged surfaces of one of these abutments and the heads may be sloped to urge the heads from locking position, once the head-retaining surface of the retainer has been withdrawn from operative engagement with the heads, under the influence of the load which tends to collapse the telescoping members.

The main object of the present invention is thus seen to be, to provide an improved locking mechanism which is capable of sustaining high thrust loads acting upon the two telescopic members.

The invention is applicable to various telescopic components shown by way of example in the accompanying drawings, of which:

Figure 1 is an elevation of an extensible member in the form of an undercarriage strut;

Figure 2 is an enlarged sectional view of that part of the strut incorporating the locking device, the locking device being shown engaged;

Figure 3 is a section similar to that of Figure 2, but showing the lock disengaged;

Figure 9 is a transverse half-section of the telescopic strut, illustrating the locking heads, with parts in the position corresponding to Figure 2.

Figure 4:
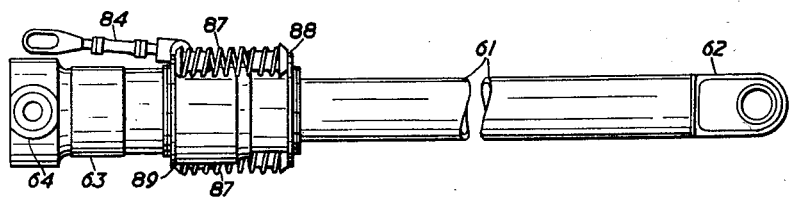
Figure 4 is an elevation of the extensible member in the form of another type of undercarriage strut or stay.

Referring to Figure 1, the strut comprises an outer tubular component 10 and a telescopic inner tubular component 11, the locking elements which engage the two components being retained in locking position when the two components are relatively extended by a locking plunger 12 (shown in dotted lines), which is typical of a retainer such as may take other forms, to be hereinafter described. The plunger 12 is slidable on a piston 13 which is fixed at the end of a stem 14 projecting centrally from the outer end cap 15 of the tubular member 10. The stem 14 has concentric fluid passageways providing communication between a circular sectioned chamber 16, Fig. 2, within the plunger 12 and a fluid connector 17 on the end cap 15, and between an annular chamber 18, Figure 3, on the opposite side of the piston 13 and a second fluid connector 19 on the end cap 15.

Referring to Figures 2 and 3, the outer tubular component 10 has an internal bore 21 leading to a stepped bore 22 which receives a locking sleeve 23, a retaining ring 24, and an outer slide bearing 25, all clamped in the stepped bore 22 by a gland nut 26. The inner tubular member 11 is formed at its outermost end with a flange 27 and another flange 28 spaced therefrom, these flanges 27 and 28 serving to retain a diametrically divided inner slide bearing 29. This inner slide bearing 29 guides the inner tubular member 11 in the bore 21 of the outer tubular member 10, while the outer slide bearing 25 forms a bearing guide around the outer surface of the inner tubular member 11. A further flange 31 on the inner tubular member 11 acts in conjunction with the retaining ring 24 to form an outer limit stop for the inner tubular member 11.

The retaining ring 24 together with the locking sleeve 23 define a locking groove 32 which is recessed from the bore 33 of the locking sleeve, this bore being of less diameter than the bore 21 in the member 10, and the bore 33 and locking groove 32 being separated by an inclined step 34 of frusto-conical form. The inwardly projecting edge of the locking sleeve 23 is similarly bevelled where it meets the bore 21 to form another inclined step 35.

The flange 31 on the inner tubular component 11 is formed with a transverse abutment face 36, and adjacent this face 36 the inner tubular member 11 is formed with a circular row of rectangular apertures 37, each of which is adapted to receive and locate the head 38 of a locking tongue 39. These locking tongues 39 have tails 41 which extend longitudinally into endwise locating engagement within a tapered annular groove 42 formed in the end of the inner slide bearing 29 opposite the abutment face 36 of the flange 31.

The head 38 of each locking tongue has an inclined face 43 which is complementally engageable with the inclined step 34 in the locking sleeve 23 upon contraction of the strut, and a second inclined face 44 which is complementally engageable with the inclined step 35 during extension of the strut. A resilient rubber ring 45 located on the inner tubular member 11 against the flange 28 acts on the tails 41 of the several locking tongues to spread the heads 38 outwardly so that they will enter the locking groove 32 when the tubular components 10 and 11 are relatively extended.

Each head 38 is formed with a further inclined face 46 which is complementally engageable with an inclined step or head-displacing surface 47 on the locking plunger 16, this step 47 being disposed between two cylindrical surfaces 48 and 49 of greater and lesser diameter respectively. The greater diameter surface 48 when underneath the locking tongues 39, as in Figure 2, serves to maintain the heads 38 fully engaged within the locking groove 32, and so may be designated a head-retaining surface, while withdrawal of the retainer 12 so that the cylindrical surface 49 of lesser diameter is beneath the heads 38 enables the latter to be withdrawn inwardly, and so to ride over the inclined steps 34 and 35 and to traverse the internal bore 33 of the locking sleeve in either direction.

The circular section chamber 16 has communication by way of the interior of a tube 51 disposed centrally within the stem 14 to the fluid connector 17, while the annular chamber 18 has communication with the connector 19 by way of the annular passageway 52 formed by clearance between the internal bore of the stem 14 and the tube 51. Admission of fluid pressure to the connector 17 and thus the chamber 16 extends the plunger 12, as in Figure 2, so that the tubular components 10 and 11 are held locked in the extended condition of the strut, wihle admission of fluid pressure to the connector 19 alone pressurises the annular chamber 18 to withdraw the plunger 12 fully, as in Figure 3, so that the tubular components 10 and 11 are free to extend or collapse.

The inclination of the co-operating surfaces on the head of the locking tongue 39 and the locking sleeve 23, i. e. the face 43 and the step 34, and the face 44 and the step 35 enable the heads 38 of the locking tongues 39 to slide from the locking groove 32 to the bore 21, or vice versa, under endwise compression or tension respectively applied to the tubular components 10 and 11 of the strut. Similarly, the co-operating inclined face 46 on each head 38 and the inclined step 47 on the plunger 12 ensures that the latter may ride freely under the heads 38 when these heads are in register with the locking groove 32. It is arranged that the tongues 39 have a small endwise clearance between the annular groove 42 of the inner slide bearing 29 and the face 36 of the flange 31 to provide, in effect, a floating pivotal location of the tails 41 in the groove 42. The nature of this floating pivotal location provides no rigid axial constraint on the tails, so that any compressive load applied to the members 10 and 11 in the locked condition of the strut is taken entirely through the heads 38 of the locking tongues 39. It will be observed that in this condition the several heads 38 engage the face 36 of the flange 31, the inclined step 34 of the locking sleeve and the full diameter surface 48 of the plunger 12 in substantially face to face engagement, while the face 36, step 34 and surface 48 are circumferentially continuous so that the strut is well able to withstand considerable thrust loads between the components 10 and 11, such thrust loads being transmitted directly between said members by way of the several heads 38 and the locking sleeve 23.

Figure 5:
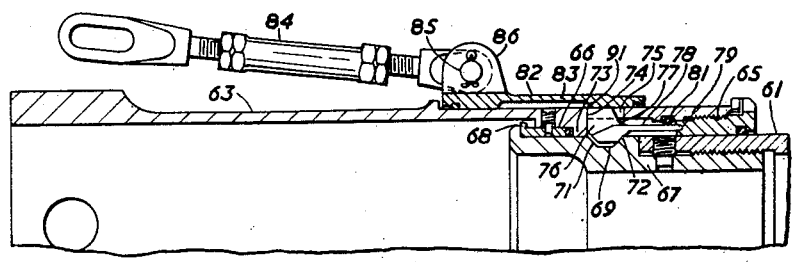
Figure 5 is an enlarged sectional view of that part of Figure 4 embodying the lock details, these being shown enlarged.

Referring now to the undercarriage stay, shown in Figures 4 and 5, this comprises a stay tube 61 having a terminal fitting 62 for connection with an undercarriage leg, and a sleeve 63 having a trunnion bearing 64 for pivotal mounting in the aircraft or a wing thereof. The sleeve 63 has outer and inner slide bearings 65 and 66 secured therein and the stay tube 61 has a flanged head 67 secured thereto, the flange 68 on said head serving in conjunction with the inner slide bearing 66 as a limit stop in the fully extended position of the stay tube 61. The flanged head 67 has a locking groove 69 recessed therein with inclined steps 71, 72 disposed on either side of the base of the groove. The sleeve 63 has an internal flange 73 formed with a transverse abutment face 74, while that portion of the sleeve 63 extending from the flange 73 is formed with a circular row of rectangular slots 75 each of which receives the head 76 of a locking tongue 77. Each locking tongue has a tail 78 which extends longitudinally in the gap between the bore of the sleeve 63 and the stay tube 61, and the ends of the tails 78 are located with clearance in an annular recess 79 which is formed in the outer slide bearing 65. A resilient rubber ring 81 is recessed into the sleeve 63 adjacent the recess 79 and acts on the tails 78 of the locking tongues 77 to contract these radially inwardly. In contrast to the embodiment previously described it will be observed that the locking tongues 77 contract inwardly into the locking groove 69 instead of outwardly as in the former example.

The locking tongues 77 are arranged to be retained in the locking groove 69 by a retainer which, in this embodiment of the invention, takes the form of a cylindrical locking collar 82 which is mounted slidably on the sleeve 63. This collar has an internal recess 83 whose diameter is greater than the internal bore of the collar 82 such that when the recess 83 is in register with the slots 75, the locking tongues 77 may be expanded outwardly through the apertures 75 in the sleeve 63 so that the stay tube 61 may ride freely under the heads 76. Locking and unlocking movement of the collar 82 may be effected by a link 84 which is pivotally connected at 85 to a lug 86 formed on the collar, the latter being normally spring-loaded into the locked position by coil springs 87, see Figure 4, which are interposed compressibly between a flange 88 on the sleeve 63 and a flange 89 on the collar 82, see Figure 4. The boundary of the recess 83 at the right-hand end in Figure 5 is formed as an inclined step 91 to ensure that the locking collar 82 may ride freely over the heads 76 of the locking tongues 77 on entering the locking position. The faces of the heads 76 which engage the inclined step 72 in the locking groove 69 and the inclined step 91 in the locking collar 82 are shaped for complemental surface-to-surface engagement as in the locking tongues of the preceding example.

Figure 6:
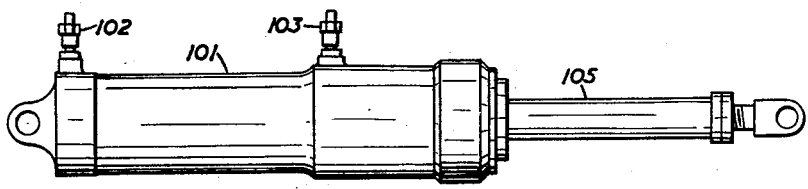
Figure 6 is an elevation of the extensible member in the form of a hydraulic jack.
Figure 7:
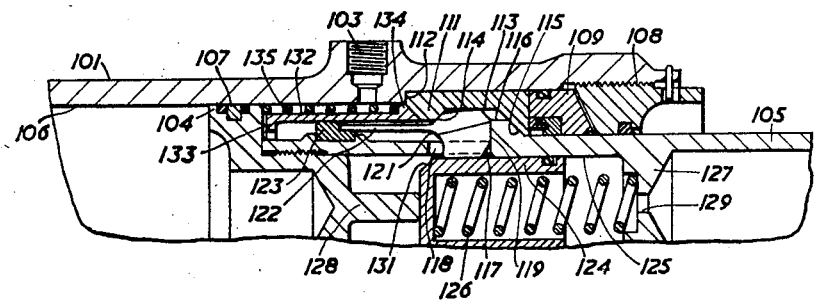
Figure 7 is an enlarged sectional view of that part of the jack which incorporates the locking device, the lock being shown engaged.
Figure 8:
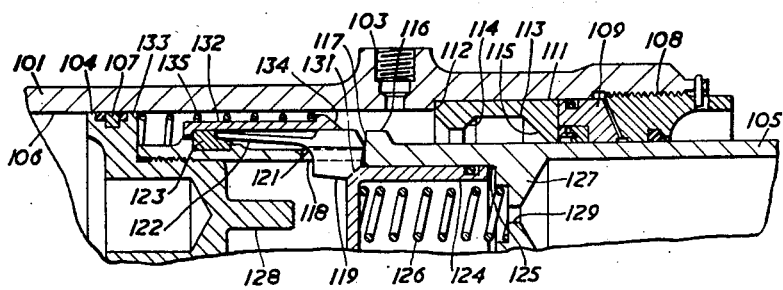
Figure 8 is a sectional view, similar to that of Figure 7, but showing the lock disengaged.

Referring now to the hydraulic jack illustrated in Figures 6, 7 and 8, this comprises a jack cylinder 101 having pressure connections 102 and 103 adjacent opposite ends for the displacement by fluid pressure applied thereto of a piston 104 which is carried on a piston rod 105 projecting through one end of the jack cylinder. As seen in Figures 7 and 8 the piston 104 is mounted in slidable sealing engagement within the bore 106 of the cylinder 101 by means of a packing ring 107 recessed into the piston 104, while an outer slide bearing for the piston rod 105 is provided by a gland nut 108 which is screwthreadedly engaged in the open end of the cylinder 101. This gland nut 108 serves to clamp a gland ring 109 and a locking sleeve 111 against an internal shoulder 112 in the bore 106 of the cylinder 101. The locking sleeve 111 is formed with a locking groove 113 whose sides are formed by inclined steps 114 and 115, the inclined step 115 extending inwardly to a clearance diameter of the piston rod 105 and forming an abutment step for a flange 116 on the piston rod 105 to limit outer extension of the same.

The flange 116 has a transverse abutment face 117 adjacent which a circular row of rectangular slots 118 are formed in that portion of the piston rod projecting beyond said face 117. These slots 118 receive the heads 119 of a plurality of locking tongues 121 and each locking tongue has a tail 122 which extends longitudinally into engagement with a rebated locating ring 123 which is fixed on the piston rod 105. The heads 119 may be extended into engagement with the locking groove 113 when in register therewith by a retainer in the form of a locking plunger 124 which is mounted in slidable sealing engagement within a counter bore 125 in the piston rod. This plunger is normally extended into locking engagement beneath the heads 119 by a coil spring 126 which is compressibly interposed between the end wall of the plunger and a transverse partition 127 within the piston rod 105, and a limit to such extension is provided by a stop pin 128 which forms a central projection of the piston 104. Depression of the locking plunger 124 against the load of its spring is effected by the application of fluid pressure to the connector 103, the spring chamber at the back of the plunger 124 being vented by an aperture 129 in the partition 127.

The nose of the plunger 124 is formed with a chamfer 131 which ensures that the plunger may ride freely under the heads 119 of the locking tongues 121 when these are free to expand into the locking groove 113.

A tongue retaining sleeve 132 having an internal flange 133 at one end is mounted slidably on the rebated locating ring 123, the flange 133 holding the sleeve 132 captive between said ring 123 and the piston 104. The other end of the sleeve 132 has a nose 134 which is complementally engageable with the end surface of the locking sleeve 111 extending radially inwardly of the shoulder 112. The bore of the sleeve 132 is of the same diameter as the inner surface of the locking sleeve 111. A spring 135 is interposed between the piston 104 and the nose 134 to load the retaining sleeve 132 resiliently against the locking sleeve 111 in the extended condition of the jack as in Figure 3.

To retract the jack, pressure is admitted to the connector 103 and effectively acts on the annular area of the piston lying between the bore 106 of the cylinder and the outside diameter of the piston rod 105. The pressure also has access through the piston rod and by way of the rectangular openings 118 to the plunger 124 which is thereby depressed against the load of its spring 126. The plunger being depressed clear of the locking tongue heads 119, these latter are contracted inwardly by the inclined step 114 under the movement of the jack piston. During the initial telescoping movement of the jack piston 104 the tongue retaining sleeve 134 is maintained in engagement with the locking sleeve 111 by the spring 135, and as the rebated locating ring 123 travels with the piston assembly towards the flange 133 of the retaining sleeve 132, the heads 119 of the locking tongues will ride over the inclined step 114 and across the bore of the locking sleeve 111 to lie within the retaining sleeve 132. Only when the locking tongues 121 are thus retained will the retaining ring 123 engage the flange 133 so that the retaining sleeve will travel with the piston assembly during the remainder of the telescoping movement.

Upon extension of the jack, the locking tongues will remain retained within the sleeve 132, and in the condition shown in Figure 8 the nose 134 has a little way to travel before it engages the locking sleeve 111. When this engagement takes place the retaining sleeve 132 will be arrested while the locking tongues 121 will continue to travel with the piston assembly, thereby passing out of engagement with the retaining sleeve 132, across the bore of the locking sleeve 111 and into register with the locking groove 113. During this movement, the locking tongue heads 119 engage the chamfer 131 on the nose of the plunger 124 whereby the latter is depressed, but when the heads 119 are in a position to enter the groove 113 the spring loaded plunger 124 rides fully under the heads 119 and retains them in locking engagement within the groove 113.

In the locked position of the jack, the several heads 119 can transmit thrust directly between the circumferentially continuous abutment surface 117 of the flange 116 and the inclined step 114 of the locking sleeve 111. As in the preceding examples any such stress is applied directly through the heads and locking sleeve from one principal component to the other, i. e. the piston rod 105 and the cylinder 101, and is thus an improvement on previously known arrangements wherein such loads are sometimes transferred through the tails of locking elements, or through that part of a piston rod or sleeve associated therewith having the rectangular openings formed therein for the location of such locking elements.

I claim as my invention:

1. In an extensible member having first and second telescopically slidable members, the first whereof is formed with a locking groove, locking mechanism comprising a flange-like abutment formed around the second of such members, a plurality of locking elements disposed around the second member, a head on each locking element disposed adjacent said flange-like abutment, locating means fixed on said second member supporting each of said locking elements in floating pivotal association with said second member for radial inward and outward movement of the head of said locking element across the flange-like abutment, cooperative stop means disposed on said first and second telescopically slidable members to provide an extension limit stop bringing the heads of said locking elements into axial register with said locking groove, and a retainer mounted on the second member at the opposite side thereof from the locking groove, said retainer having a head-displacing surface and a head-retaining surface and being axially movable across said heads, when said first and second members are relatively extended, to displace the locking elements pivotally so that their heads enter into engagement with the flange-like abutment on said second member, the side of the groove opposite said abutment on the first member, and head-retaining surface on the retainer.

2. In an extensible member having first and second telescopically slidable members, the first whereof is formed with a locking groove, locking mechanism comprising a flange-like abutment formed around the second of such members, a plurality of locking elements disposed around the second member, a head on each locking element disposed adjacent the flange-like abutment, a tail portion of each locking element extending longitudinally from the head between said first and second members, a ring fixed on said first member, an annular recess formed in one end face of the ring, the annular recess receiving and locating the tails of the several locking elements in floating pivotal association with said ring for radial inward and outward movement of the heads across the flange-like abutment, cooperative stop means disposed on said first and second members to provide an extension limit stop to locate the heads of the several locking elements into axial registry with said locking groove, and a retainer mounted on the second member at the opposite side thereof from the locking groove, said retainer having a head-displacing surface and a head-retaining surface, and being axially movable across said heads, when said first and second members are relatively extended, to displace the locking elements pivotally so that their heads enter into engagement with the flange-like abutment on said second member, the side of the groove opposite said abutment on the second member, and the head-retaining surface on the retainer, the heads then providing a direct thrust transmitting connection between the flange-like abutment on said second member and the side of the groove opposite said abutment on the second member, and the retainer by the engagement of the heads with its head-retaining surface preventing withdrawal of the heads.

3. The combination as in claim 2, comprising a resiliently deformable ring mounted on said second member adjacent the pivoted ends of the tails, this ring acting compressively to spring load the heads of the locking elements towards the locking groove.

4. The combination as in claim 2, wherein the ring which is mounted on the second member constitutes a slide bearing for the first member.

5. The combination as in claim 2, wherein the head of each locking element is shaped for engagement with the abutment on transverse mating faces, and with the retainer and with the locking groove on inclined mating faces, the inclined face on the retainer being sloped to displace the heads into the locking groove, and the inclined face on the locking groove being so sloped that when the retainer is withdrawn it will displace the heads from the locking groove under a thrust load acting between the telescopically slidable members.

6. An extensible member comprising first and second telescopically slidable members mounted one to the other in overlapping relationship, the first such member being formed with a locking groove around the overlapping end portion, a flange-like abutment formed around the overlapping end portion of the second of such members, said second member, adjacent said abutment, being formed with a circular row of slots, a plurality of locking elements disposed around said second member, a head on each locking element disposed in axial thrust-transmitting relation to said abutment, the several heads being received one in each slot for location of the locking elements in spaced relationship, a tail portion of each locking element extending longitudinally from the head between said first and second members, a ring fixed on said second member, an annular recess formed in one end face of the ring, the annular recess receiving and locating the tails of the several locking elements in floating pivotal association with said ring for radial inward and outward movement of the heads in the slots and across the flange-like abutment, cooperative stop means disposed on said first and second members to provide an extension limit stop bringing the heads of said locking elements into axial registry with said locking groove, a locking cylinder mounted slidably on the second member at the opposite side thereof from the locking groove, said locking cylinder having a head-displacing surface and a head-retaining surface, and means to displace the locking cylinder axially across said heads in both directions, the head-displacing surface of said locking cylinder being engageable with the heads by one direction of movement, when said first and second members are relatively extended, to displace the several heads into the locking groove and in thrust-transmitting relation to the face thereof which faces said abutment, the head-retaining surface of the locking cylinder being engageable with the heads, upon further movement of the locking cylinder in the same direction, to retain the heads therein, and the locking cylinder being operative in the other direction of movement to disengage its head-retaining surface from the heads, to release said heads so that these are displaceable from the locking groove under a thrust load acting between the abutment and the opposed face of the locking groove upon the respective telescopically slidable members.

7. In combination with a first member and a second member relatively telescopically slidable one within the other, mechanism to lock said members in a limit position, comprising a plurality of locking elements annularly interposed between said first and second members, and each including a head and an axially directed tail, locating means engaging the tails of the locking elements for pivotal inward and outward movement of the respective heads, one of said members being formed with a circumferential groove which, when in registry with the heads, will afford room for such pivotal movement, axially facing and opposed abutment surfaces on each of the first and second members, located adjacent the opposite ends of the heads, when the latter are in the locking position, complemental abutment surfaces on the heads, engageable with the respective abutment surfaces on the two members, to transmit axial loads from one member to the other directly through the heads, the pivotal mountings of the several tails of the locking elements having clearance sufficient to relieve said tails and their pivotal mountings of any thus transmitted load, and a lock-retaining device movable axially relative to the locking elements, at the side of the latter opposite the circumferential groove, and having a surface engageable with the heads to retain the locking elements in their load-transmitting positions, said device having a relieved surface which when in registry with the heads will permit their pivotal withdrawal from their load-transmitting positions.

References Cited in the file of this patent
UNITED STATES PATENTS

| | | |
|---|---|---|
| 2,062,765 | Schlage | Dec. 1, 1936 |
| 2,453,855 | Oliver | Nov. 16, 1948 |